UNITED STATES PATENT OFFICE.

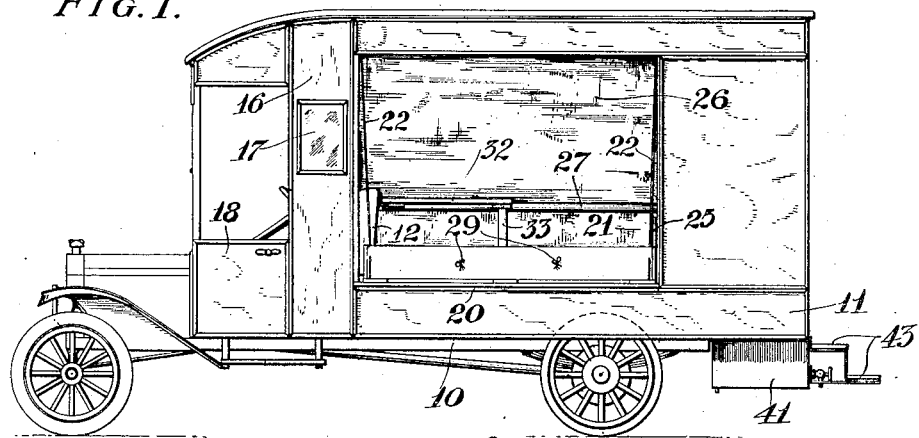
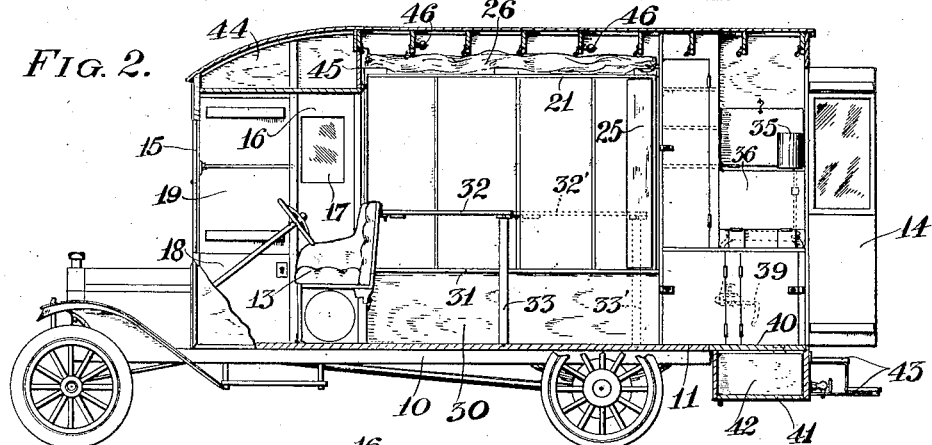
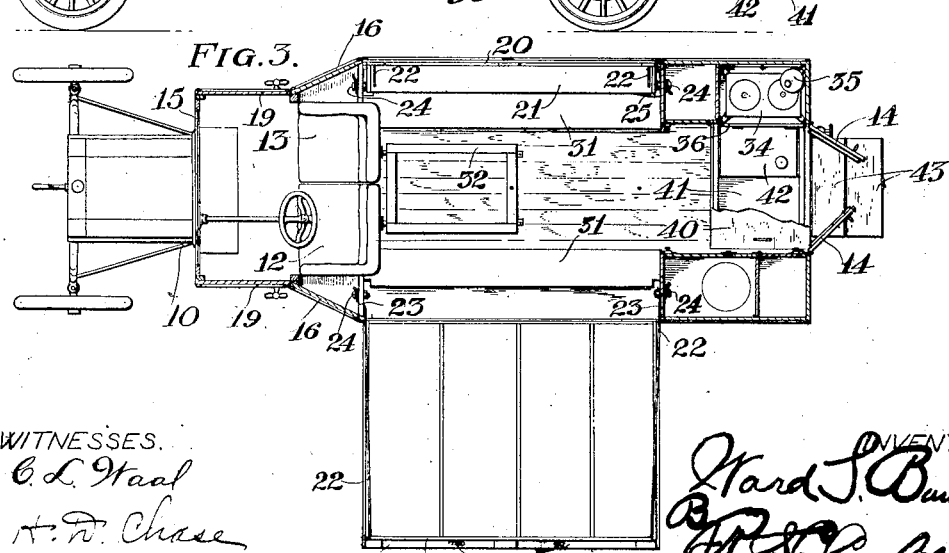

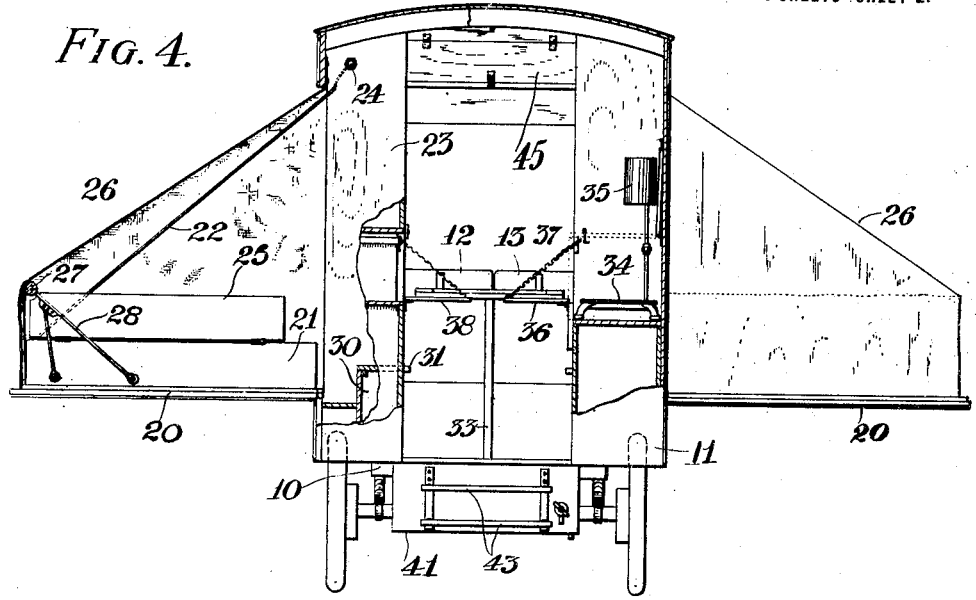
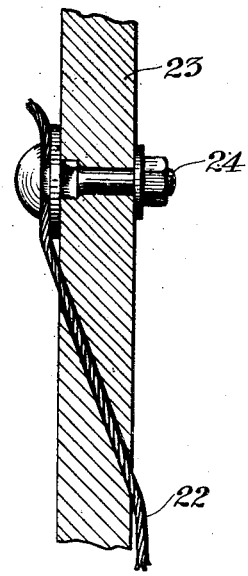
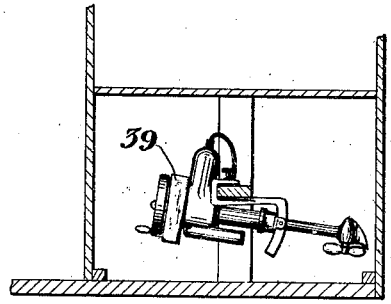

WARD S. BUNKER, OF WAUKESHA, WISCONSIN.

CAMPING-AUTOMOBILE.

1,327,589.     Specification of Letters Patent.     Patented Jan. 6, 1920.

Application filed October 4, 1917. Serial No. 194,800.

*To all whom it may concern:*

Be it known that I, WARD S. BUNKER, a citizen of the United States, and resident of Waukesha, in the county of Waukesha and State of Wisconsin, have invented new and useful Improvements in Camping-Automobiles, of which the following is a description, reference being had to the accompanying drawings, which are a part of this specification.

This invention has for its object to provide a camping automobile containing the complete camping outfit and quickly convertible for camping use by reason of the sides being provided with beds which may be lowered into place with their screen covering and forming with the interior an insect-tight inclosure.

Another object of the invention is to provide such a camping automobile with its interior equipped for use as a dining room and with its rear end divided into compartments for use as a kitchen.

With the above and other objects in view, the invention consists in the camping truck as herein claimed and all equivalents.

Referring to the accompanying drawings in which like characters of reference indicate the same parts in the different views:

Figure 1 is a side view of the camping truck of this invention with the beds lowered and their screen covering removed;

Fig. 2 is a longitudinal sectional view thereof with the bed raised to its closed position;

Fig. 3 is a sectional plan view thereof;

Fig. 4 is a sectional end view with the beds lowered;

Fig. 5 is a detail view showing the connection for the bed supporting cables; and Fig. 6 is a detail view of one of the storage compartments.

In these drawings 10 indicates the automobile truck proper having mounted thereon the body portion 11 containing the driver's seat 12 and a swinging companion seat 13 at the front portion thereof, and being closed at the rear by swinging doors 14. The body is preferably of uniform width except at the front end which is narrower to fit the ordinary windshield 15. The change in width takes place at about the position of the seats 12 and 13, and the diverging panels 16 located here contain windows 17, while the doors 18 are adapted to have the space above them closed by panels 19 which may be either solid or of screen frames for use during the night or in stormy weather.

Next to the converging panels 16 there are hinged the bed panels 20 to which are rigidly secured box bed springs 21. The beds are supported in their horizontal positions by cables 22 connected to the outer edges of the box springs 21 and to the upper parts of partitions 23 which form a frame in the side of the automobile body for receiving the bed when it is raised to its closed position. As shown in Fig. 5, the cable end is preferably passed obliquely through the partition 23 and is bound between the head and washer of a bolt 24. The same method may be employed for joining the other end of the cable to the box springs 21. At one end of the box springs is hinged a board 25 which may be raised to form the head of the bed.

An awning 26 or flexible covering of waterproof material is stretched over the bed from the top of the panel opening in the side of the car body and over a rod 27 on folding brackets 28 and secured to the panel 20. This covering continues over the ends of the bed as well, connecting with the ends of the panel and the sides of the panel opening. The bed is thus completely surrounded by the tent-like awning or weatherproof covering.

The mattress is bound to the spring frame 21 as by means of ropes 29 passing therethrough and through the spring frame so that it is held in place when the bed is folded to its upright position. The space beneath the folded bed forms a box-like receptacle 30 for holding the bedclothing, etc., and the hinged cover thereof constitutes a seat 31 which may be used as such whether the beds are raised or lowered. The space between the seats may be occupied by a table 32 which is provided with hooks at one end to engage eye-brackets on the backs of the seats 12 and 13, and a leg member 33 is adapted to be secured to the other end of the table and to the floor to support the table. The table 32 is preferably in the form of a frame having one of the panels 19 attached thereto and serving as the table top. The other panel 19 may likewise be used as a top for an extension of the table 32' when a greater table length is desired.

The seat 13 is preferably mounted to swing out of the way and permit of a passageway from the front door 18 to the interior of the automobile.

At the rear portion of the automobile body the space on either side of the central passageway is divided into compartments as convenient for various purposes, such as the storage of food, the inclosure of a gasolene stove, etc., so that this portion of the car may serve as a kitchen and pantry. A gasolene stove 34 with a swinging reservoir 35 is shown in a compartment 36 as preferred, and the cover of this compartment may be swung downwardly to a horizontal position where it is held by a chain 37 to constitute a working shelf. Likewise the hinged door of a bread box 38 on the opposite side of the passageway may form a shelf on which the bread may be cut. The space beneath the stove compartment and the bread compartment may be used for storing tableware and kitchen utensils, and in one of them is shown a cross bar on which a rowboat motor 39 is clamped.

Through the trap door 40 in the floor of the passageway in the kitchen portion of the automobile access may be had to an icebox 41 carried beneath the automobile body and containing a water receptacle 42. Steps 43 are mounted at the rear leading up to the passageway.

The space 44 above the front portion of the automobile is provided with a hinged door 45 and forms a suitable compartment for receiving the panels 19 the screens and the table legs 33 and other small parts when not in use.

While traveling the device presents the appearance of an ordinary truck, and whenever it is desired to set up camp it is only necessary to stop the automobile along the side of the road where it will stand level. The table may be set up and the meal prepared, all necessaries being conveniently accessible. Electric lights 46 are provided for lighting the interior of the car when necessary.

The beds are simply unfastened and lowered into place where they are held by the cables. The front of the automobile may be entirely closed by means of the panels 19 or by means of screen panels, not shown, which will admit the air, and the rear doors 14 may be closed with a glass sash in place, or the glass sash may be moved out of place and a screen sash substituted for ventilation. With the screen sashes at the front and the rear of the automobile there is a through passageway for a current of air for ventilation in addition to such ventilation as takes place through the porous tent-like awning or cover for the bed.

What I claim as new and desire to secure by Letters Patent is:

1. An automobile for camping purposes, comprising a body having front seats and a longitudinal passageway from said seats to the rear end, side seats on either side of the passageway, and a table in the passageway detachably connected to the backs of the front seats.

2. An automobile for camping purposes, comprising a body having front seats and a passageway extending therefrom to the rear end, side seats on either side of the passageway, a table in the passageway detachably connected to the backs of the front seats, and made up beds forming cushion backs for the side seats and adapted to swing outwardly to a horizontal position.

3. An automobile for camping purposes, comprising a body having front seats with a passageway extending therefrom to the rear end, side seats on either side of the passageway, beds forming the backs of the side seats and adapted to swing outwardly to a horizontal position and compartments at the sides of the passageway at the rear end of the body to contain a stove, kitchen utensils and the like, and having hinged doors supported in horizontal positions in the passageway to form work shelves.

4. An automobile for camping purposes, comprising a body having front seats with a passageway leading therefrom to the rear end, seats on either side of the passageway, a table in the passageway, compartments at the rear end of the body on either side for containing a gasolene stove, kitchen utensils, etc., a trap door in the floor at the rear end of the passageway, and an icebox beneath the floor accessible through the trap door.

5. An automobile for camping purposes comprising a body having front seats with a passageway leading therefrom to the rear end, a kitchenette at the rear end of the body at the sides of the passageway, side seats on either side of the passageway between the kitchenette and the front seats, a table in the passageway detachably connected to the front seats and extending down between the side seats, and made up beds forming cushion backs for the side seats and adapted to swing outwardly to a horizontal position.

In testimony whereof, I affix my signature in presence of two witnesses.

WARD S. BUNKER.

Witnesses:
R. S. C. CALDWELL,
H. D. CHASE.